INVENTOR
NILS O. ROSAEN

BY Hauke, Krass, & Gifford
ATTORNEYS

INVENTOR
NILS O. ROSAEN

INVENTOR
NILS O. ROSAEN

BY Hauke, Krass, & Gifford

ATTORNEYS

United States Patent Office 3,425,558
Patented Feb. 4, 1969

3,425,558
BACKWASH MEANS FOR DUAL
FILTER ELEMENTS
Nils O. Rosaen, Bloomfield Hills, Mich., assignor, by mesne assignments, to Universal Filters, Inc., Hazel Park, Mich., a corporation of Michigan
Continuation-in-part of application Ser. No. 539,863, Apr. 4, 1966. This application Aug. 21, 1967, Ser. No. 661,968
U.S. Cl. 210—108     15 Claims
Int. Cl. B01d 23/24

ABSTRACT OF THE DISCLOSURE

A filter housing partitioned by a rotatable filter carrier structure into a filtering chamber where foreign matter is separated from a fluid system by a first filter, and a cleaning chamber where a second filter is cleaned and back flushed. The back flushing is produced by a cylindrical pressure chamber in communication with the cleaning chamber and a piston in the pressure chamber which produces a pressure wave which assists in cleaning the foreign matter from the filter and discharging the foreign matter to a sump. The carrier structure rotates to alternate the position of the filter elements in the cleaning and filtering chambers when the clogged condition of the filter in the filtering chamber produces a predetermined pressure drop in the fluid system.

CROSS-REFERENCE TO RELATED APPLICATION

This application is a continuation-in-part of my application for "Dual Clean Filters," Ser. No. 539,863, filed Apr. 4, 1966.

BACKROUND OF THE INVENTION

Field of the invention

This invention relates to a filtering apparatus for a fluid system with means for automatically exchanging a clogged filter element with a clean filter element without disrupting the filtered fluid flow in the system and more particularly to apparatus with self contained means for automatically cleaning the clogged element after removal from the system so that the cycle may be repeated.

Description of the prior art

A number of filter devices have been disclosed in the prior art which have had as their objective a structure which permits the separation of a clogged filter element from a fluid system without interrupting the continuity of the fluid flow. In order to provide a continuous filtering action of the moving fluid, some of the prior art devices have disclosed a filter element divided into sealed sections with means for continuously moving the filter element so that there is always a section disposed in the path of the moving fluid, while another section is fluidly separated from the system for purposes of cleanding. Generally such devices have had a number of inherent drawbacks limiting their utility. For instance, such devices have required separate means for cleaning the clogged section such as by introducing fluid from an outside source. Generally they have a continuously rotating filter element which results in a high wear rate on the moving components.

My aforementioned co-pending patent application disclosed a novel filter device having a number of advantages over the prior art by providing a filter housing partitioned by a rotating carrier structure into a pair of chambers including a first chamber in the path of the moving fluid and a second chamber separated from the first chamber. A filter element mounted on the carrier structure and disposed in the first chamber separates foreign matter from the system fluid as it passes through the housing. A second filter in the second chamber is cleaned by a nozzle which introduces pressurized fluid from the first chamber and is backwashed by a pressure surge in the second chamber produced by an expansible bladder which discharges the foreign matter to a sump. Means were disclosed for detecting the clogged condition of the filter in the first chamber, as manifested in the pressure differential created by the accumulation of foreign matter, and energizing a motor to rotate the carrier structure to exchange the positions of the two filters in the two chambers when the pressure drop reached a predetermined level.

The advantages of the filtering apparatus of my co-pending application include the self contained backwash feature as opposed to introducing a flushing fluid from an exterior source and the intermittent filter exchange as opposed to a high wear, continuously exchanging filter apparatus.

The broad purpose of the present invention is to further improve filter devices of the aforementioned type by providing an improved back flushing means for producing a high flow rate through the isolated filter with a self-adjusting sealing plate sealing the first chamber from the second chamber.

SUMMARY

The preferred embodiment of the present invention, which will be subsequently described in greater detail, takes the form of a filter housing having an interior fluid chamber with an inlet and an outlet communicating with the fluid chamber. A rotatable carrier structure disposed in the fluid chamber has a partition dividing the chamber into a pair of subchambers including a filtering chamber into which the fluid is delivered from the inlet, filtered, and then discharged through the outlet; and a cleaning chamber, separate from the filtering chamber. Self-adjusting vanes resiliently mounted along opposite edges of the partition sealingly engage the sidewalls of the fluid chamber. A semi-cylindrical filter element disposed in each of the subchambers is removably mounted on the carrier structure by a novel form of clip means. The clip means comprise a first clip carried along the edge of the filter element having a J-shaped cross-section and a second clip carried by the carrier structure also having a J-shaped cross-section, the two clips being engaged by a retainer clip having a C-shaped cross-section.

An annular plate resiliently mounted within the fluid chamber seats on the upper edge of the filter elements. Spring means urge the annular plate into engagement with the filter carrier and assist the vanes in sealing the filtering chamber against fluid leakage from the cleaning chamber and also compensates for wear and dimensional tolerances.

A pressure chamber fluidly communicating with the cleaning chamber is formed into the shape of a cylinder. A piston disposed in the pressure chamber is adapted to produce a backwash through the filter in the cleaning chamber to flush the foreign matter to a sump. A nozzle directs pressurized fluid from the filtering chamber against the filter element in the cleaning chamber to dislodge the foreign particles deposited on the filter element before the backwash step.

This improved means in the form of the cylinder and piston arrangement for inducing a reverse flow through the filter element provides a high flow backwash so that the element in the cleaning chamber is in a clean condition for exchange with the clogged element in the filtering chamber.

It is therefore an object of the present invention to provide an improved filter device for removing foreign matter from a moving fluid system and having a first filter element disposed in the moving fluid of the system, a second clean element separated from the normal flow path of the system fluid and self energizing means responsive to the first element assuming a clogged condition to exchange the two elements without disrupting the filtered fluid flow in the system.

It is another object of the present invention to improve self-cleaning, fluid filter devices by providing means for introducing a reverse fluid flow through a clogged element which takes the form of a cylinder for accumulating the system fluid and a piston in the cylinder for producing a surge of the accumulated fluid in a reverse direction through the clogged element.

Still another object of the present invention is to provide an improved self-cleaning filter device having self contained means for back flushing a clogged filter element.

Another object of the present invention is to reduce the wear rate of filter devices having movable components for exchanging filter elements.

Still another object of the present invention is to improve filter devices having a filter structure rotated within a fluid chamber with partition means dividing the fluid chamber into a pair of subchambers by providing resiliently mounted, self adjusting sealing means carried along the side edges of the partition means and engaging the walls of the fluid chamber.

A still further object of the present invention is to improve multi-element filter devices having elements which are exchanged into and out of filtering engagement with a fluid system by providing novel clip means for releasably mounting the filter elements to filter support means.

Still further objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
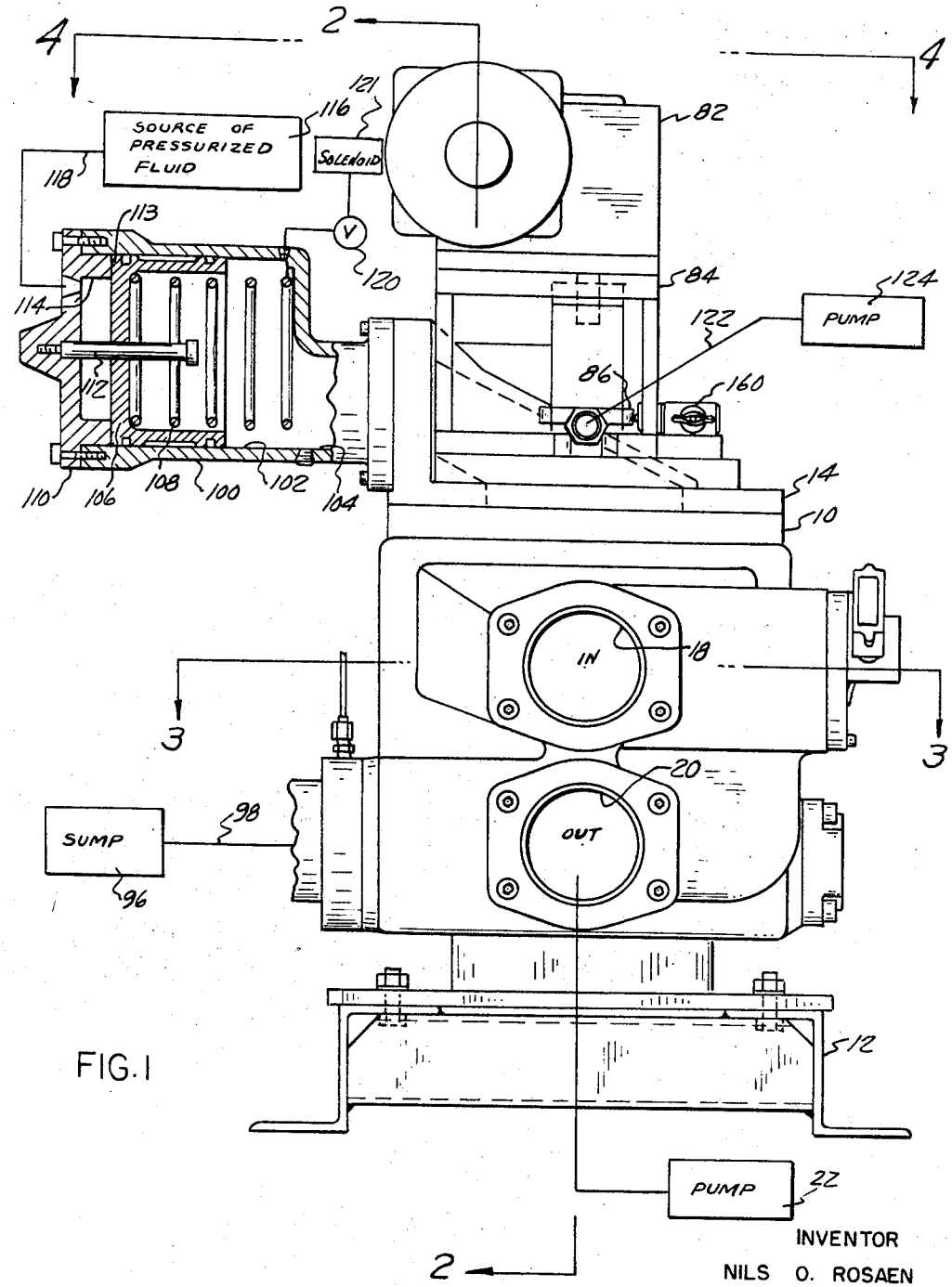
FIGURE 1 is an elevational view of a filter device illustrating a preferred embodiment of the present invention incorporated in a fluid system with parts illustrated schematically for purposes of clarity.

Referring to the drawings, a preferred filter device comprises a housing 10 mounted on a support 12. A cap member 14 secured to the upper end of the housing 10 cooperates with the housing to define a substantially cylindrical fluid chamber 16.

The housing 10 has a fluid inlet 18 and a fluid outlet 20 both of which communicate with the fluid chamber 16. A pump 22 is preferably connected to the outlet 20 by a conduit 24. However, in a low pressure system, inlet 18 could be connected to the pump outlet and outlet 20 would then provide the inlet to the fluid system from the filter.

A vertically mounted carrier shaft 26 is supported for rotation in the fluid chamber 16 with its lower end journalled in a bushing 28 and its upper end journalled in an upper bushing 30.

Figure 3:
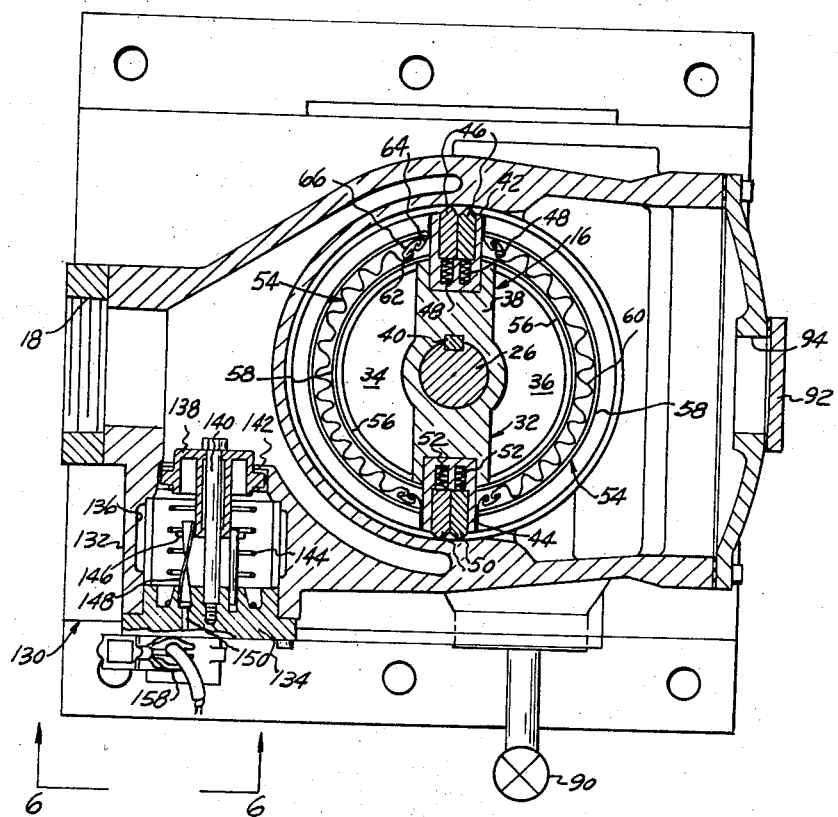
FIGURE 3 is a sectional view taken along lines 3—3 of FIGURE 1.

Referring to FIGURE 3, partition means 32 carried by the shaft 26 divides the fluid chamber 16 into a pair of subchambers including a filtering chamber 34 and a cleaning chamber 36. The filtering chamber 34 is in fluid communication with the inlet 18 and the outlet 20, the system fluid normally being delivered through the inlet 18 into the filtering chamber 34 and discharged through the outlet 20. The cleaning chamber 36 is separate from the filtering chamber 34 and sealed so that fluid cannot leak from the cleaning chamber 36 into the filtering chamber 34.

Partition means 32 comprises a partition member 38 joined by a key 40 to the shaft 26 so that the shaft 26 and the partition member 38 rotate together. The opposite side edges of the partition 38 are recessed to provide means for mounting seal retainers 42 and 44. The seal retainers extend substantially the full height of the fluid chamber 16.

A pair of resilient vanes 46 are mounted in the retainer 42 and biased toward the wall of the fluid chamber 36 by a pair of spring members 48 carried by the retainer 42. Thus the vanes 46 are at all times engaged with the wall of the fluid chamber 16 and are self adjusting to compensate for the wear of their engaged edges.

A second pair of resilient vanes 50 are mounted in the opposite retainer 44 and spring biased into continuous engagement with the wall of the filter chamber 16 by a pair of springs 52.

Filter cartridges or elements 54 are mounted on each side of the partition member 38 with one of the filter cartridges 54 being disposed in the cleaning chamber 36 and the other filter cartridge 54 being disposed in the filtering chamber 34. Each filter cartridge comprises an inner semi-cylindrical retainer 56, an outer semi-cylindrical retainer 58, a pleated filter element 60 disposed between the inner and outer retainer 56 and 58, and end caps 59 (best shown in FIGURE 2). The inner and outer retainers 56 and 58 are attached to the vane retainers 42 and 44.

The pleated element 60 is preferably formed of a fine mesh wire cloth having its opposite side edges attached to a clip 62 having a J-shaped cross-section and a companion clip 64 having a J-shaped cross-section is attached to each side of the retainers 42 and 44 with each pair of clips 62 and 64 joined by an elongated retainer 66 having a C-shaped cross-section. The retainers 66 are slidably engaged to the clips 62 and 64 and permit the pleated filter members to be easily and quickly separated from the partition means.

Figure 2:
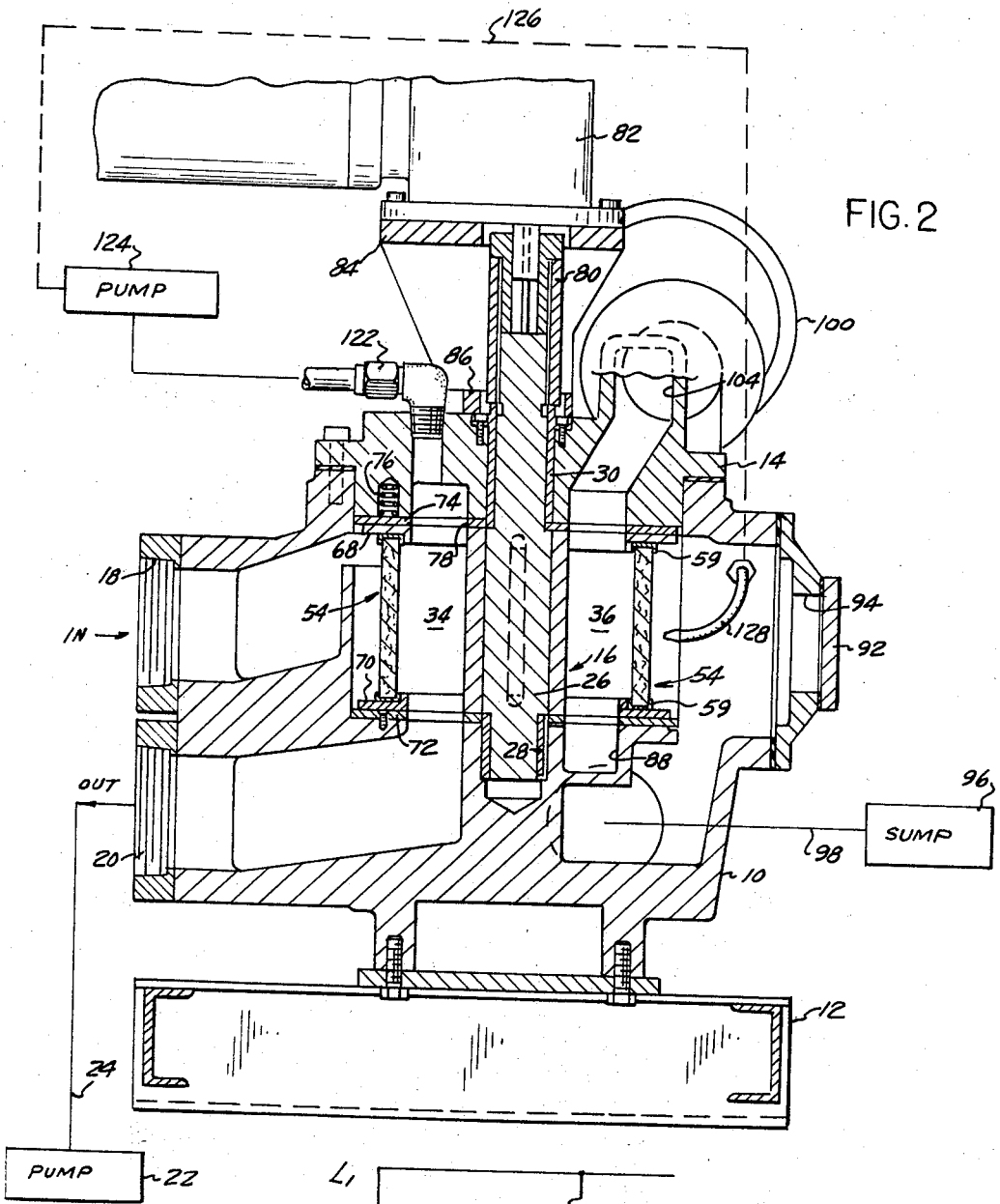
FIGURE 2 is a sectional view taken along lines 2—2 of FIGURE 1.

As best seen in FIGURE 2, the two filter cartridges 54 are sandwiched between an upper annular filter plate 68 and a lower annular filter plate 70 which are carried by partition means 32. The lower filter plate 70 is seated on a lower annular wear plate 72 which is mounted on the lower surface of the fluid chamber 16.

An upper annularly shaped wear plate 74 is engaged with the upper filter plate 68 and urged downwardly against the filter plate 68 by a plurality of spring means 76 (only one of which is illustrated) recessed within the cap member 14. This arrangement permits the wear plate 74 to be in continual engagement with the filter plate 68 and in addition compensates for wear, dimensional tolerances and the like so that there is a continual seal between the cleaning chamber 36 and the filter chamber 34.

The upper end of the carrier shaft 26 is coupled through an internally splined member 80 to the output of a gear motor 82 which is supported on a mounting pedestal 84 on top of the cap 14. The gear motor 82 in response to signal means, which will be subsequently described, rotates the carrier shaft 26 180° to exchange the filters 54 disposed in the cleaning chamber 36 and the filtering chamber 34. A cam 86 is carried by the member 80.

As best seen in FIGURE 2, a sediment chamber 88 formed below the cleaning chamber 36 provides means for accumulating foreign matter that has been dislodged from the interior of the filter cartridge 54 disposed in the cleaning chamber 36. Referring to FIGURE 3, a valve 90 provides means for removing the foreign matter that has accumulated in the sediment chamber 88.

As best seen in FIGURE 2, a plastic, transparent plate 92 is mounted over an aperture 94 in the housing 10 and provides means for visually observing the interior of the cleaning chamber 36. Plate 92 can also be formed of a nontransparent material.

A sump 96 is fluidly connected through a conduit 98 to the lowermost part of the cleaning chamber 36.

Figure 4:
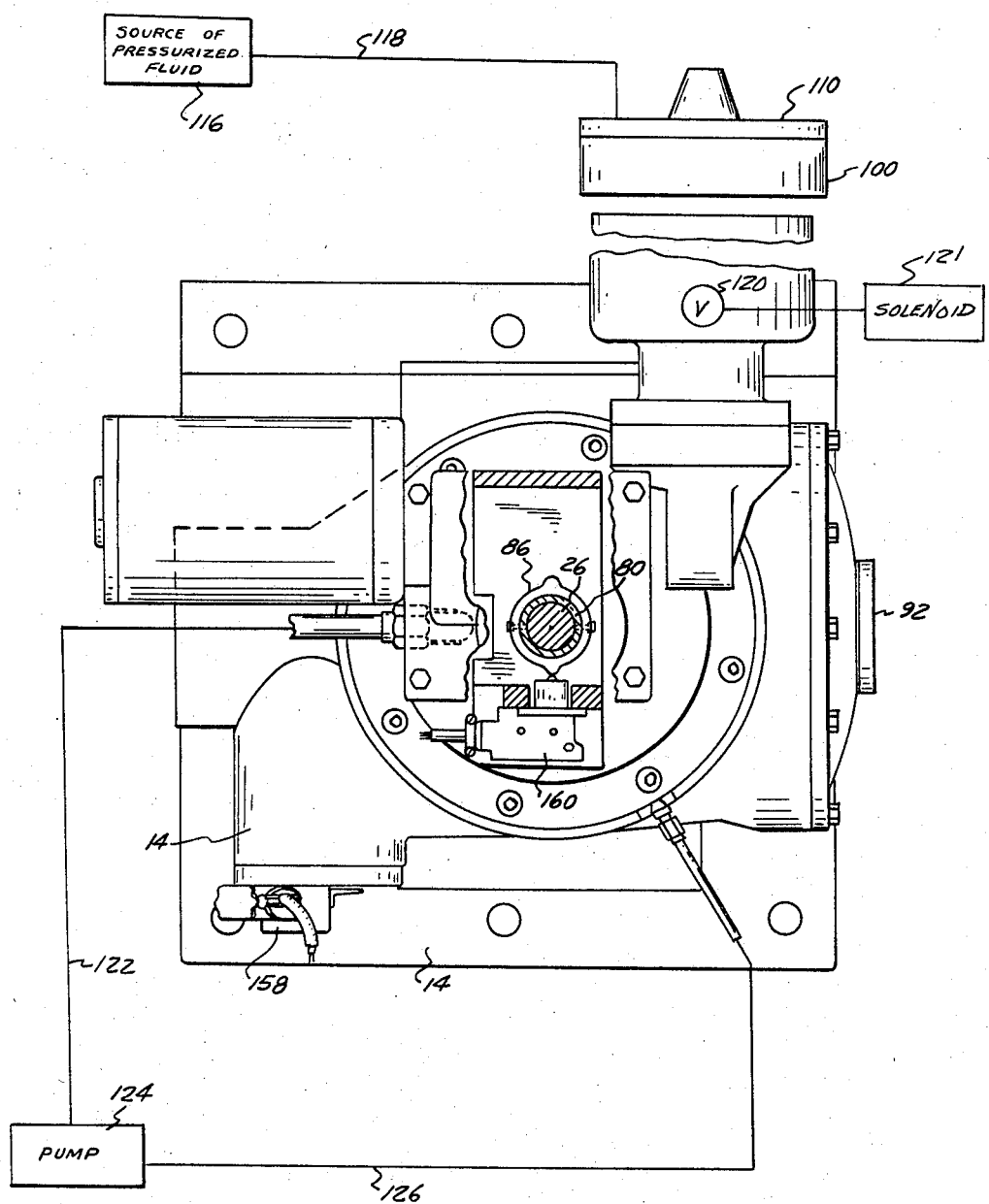
FIGURE 4 is a plan view of the device of FIGURE 1 with parts broken away.

Referring to FIGURES 1 and 4, a cylindrically shaped member 100 is mounted on the cap 14 above the cleaning chamber 36 and defines a substantially cylindrically shaped pressure chamber 102. A passage 104 fluidly connects the pressure chamber 102 with the cleaning chamber 36. A cup shaped piston 106 is slidably disposed in the pressure chamber 102 and is biased in a direction away from the passage 104 by a spring 108.

The pressure chamber 102 is closed off by a cap 110 which carries an inwardly directed guide rod 112. The guide rod 112 guides the piston 106 between its extended and retracted positions within the pressure chamber 102. The cap 110 has an inwardly directed annular shoulder 113. When the piston 106 is in its fully retracted position, it abuts the shoulder 113 and forms a chamber 114.

In response to a signal, pressurized fluid from a source 116 is introduced through a conduit 118 into the chamber 114 and urges the piston in a direction away from cap 110 and toward passage 104. This creates a pressure wave of the accumulated fluid in chamber 102 which travels through the cleaning chamber 36 and delivers foreign matter disposed in the cleaning chamber through the conduit 98 to the sump 96. This backwash or reverse flow through the filter 54 is associated with substantial movement of fluid flowing at a high rate so that the filter cartridge 54 and the cleaning chamber is completely flushed.

Because the pressure chamber 102 is disposed above the fluid chamber 16, any accumulation of air which has a tendency to collect within the filter device rises upwardly into the pressure chamber 102. An air-bleed valve 120 provides means for drawing off the accumulation of air to protect the other components in the fluid system. Valve 120 is an on-off valve controlled by a solenoid 121. Solenoid 121 is electrically connected in the system so that valve 120 is open in the air-bleed position when the filter system is in operation. When the system is not operating, solenoid 121 closes valve 120 to prevent the pressure chamber from draining its accumulated fluid.

As can best be seen in FIGURES 2 and 4, a conduit 122 having its inner end communicating with the filtering chamber 34 on the outlet side of the filter cartridge 54 disposed in the filtering chamber 34 delivers relatively clean fluid to a pump 124 which discharges pressurized fluid through conduit means 126 to a nozzle 128. The nozzle 128 is mounted within the cleaning chamber 36 and directs the pressurized fluid on the outer surface of the filter cartridge 54 which is disposed in the cleaning chamber 36. This continuously flowing pressurized stream dislodges foreign matter from the outer surface of the filter cartridge 54 as it rotates from the filtering chamber 34 into the cleaning chamber 36. The dislodged foreign matter is subsequently removed by the backwash produced by the movement of the piston 106 in the pressure chamber 102.

Referring to FIGURE 3, pressure sensing means 130 provides means for detecting a fluid pressure change at the inlet 18 and comprises a substantially cylindrical extension 132 of the housing 10 with a cover plate 134 cooperating with the extension 132 to define a chamber 136. A cup shaped piston member 138 is slidably axially carried by a rod 140 extending inwardly from the cap 134. The piston 138 is arranged so that its peripheral surface has a smooth sliding fit with the inner surface of the opening of the extension 132 adjacent the inlet 18.

A compression spring 144 having one end seated against the cap 134 and its opposite end reacting against the piston 138 biases the piston toward the inlet 18. The spring 144 is selected to retain the member 138 in a position abutting the enlarged head of the rod 140 when the filter cartridge 54 disposed in the filtering chamber is in a clean condition. However, as the filter element 54 disposed in the filtering chamber 34 filters out foreign matter from the fluid and assumes a clogged condition, it creates an obstruction reducing the fluid velocity such that the inlet pressure increases sufficiently to move the member 138 axially against the force of the spring 144.

The piston 138 has an inwardly directed pilot portion 146 bearing against a crank arm 148 having a regular longitudinal twist. The crank arm 148 is supported for rotation about its longitudinal axis on the inner end of a shaft 150. The outer end of the shaft 150 is journalled in the cover plate 134 and extends through the cover plate.

Figure 6:
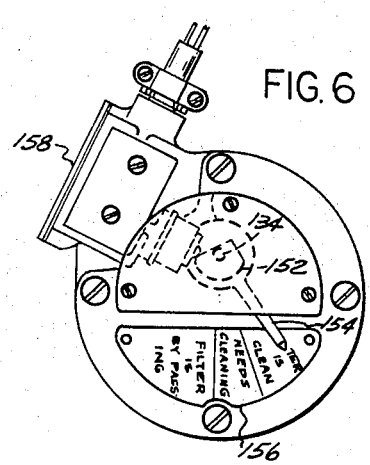
FIGURE 6 is an enlarged view taken along lines 6—6 of FIGURE 3.

As best seen in FIGURE 6, the outer end of the shaft 134 carries a cam 152 and a pointer 154. As the piston 138 moves inwardly against the bias of spring 144 in response to the increased pressure in the inlet 18, the pilot portion 146 causes the crank arm 148 and the shaft 150 to rotate thereby causing the pointer 154 to traverse a legend plate 156 carried on the cap 134. The pointer 154 and the legend plate 156 cooperate to visually indicate the filtering condition of the filter element 54 disposed in the filtering chamber 34.

A normally open plunger type switch 158 mounted on the cap 134 is arranged such that when the cam 152 rotates clockwise as the filter element 54 in the filter chamber 34 assumes a clogged state, the switch 158 energizes the gear motor 82 which commences to rotate the carrier shaft 26.

A normally closed switch 160 mounted on the cover plate 14 is engaged with the cam 86.

Figure 5:
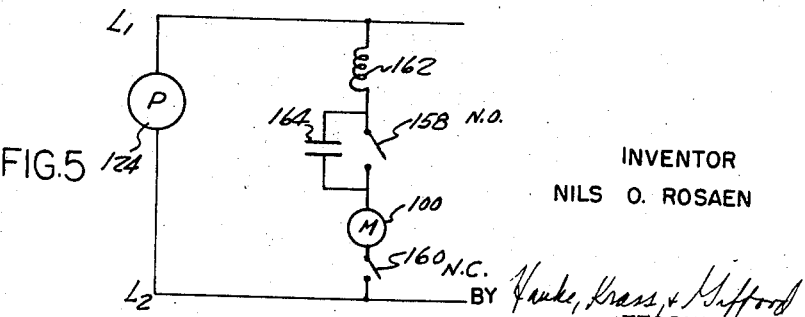
FIGURE 5 is a schematic view of the preferred electrical system employed by the filter device.

Referring to FIGURE 5, the preferred electrical circuit shows that the switches 158 and 160 are connected in series with the motor 82 and the coil 162 of the starter relay for the motor 82. Normally open contacts 164 of the starter relay coil shunt the switch 158. The normally open switch 158 is closed upon an increased pressure differential across the filter element 54 disposed in the filtering chamber 34 so that the relay coil 162 becomes energized which in turn energizes the motor 82 and locks in the contacts 164.

As the carrier shaft 26 commences to rotate, the clean filter element 54 in the cleaning chamber 36 is rotated into the filtering chamber 34 with the pressure differential dropping to its normal level so that the switch 158 resumes its normally open condition. The cam 86 engages the normally closed switch 160 to momentarily move it to an open position and to thus de-energize the motor 82 and the relay 164. As the motor 82 through inertia, moves the lobe of the cam 86 past the switch 160 so that it again assumes its closed condition, the circuit remains open until the next cycle commences upon a build up of the pressure across the filter element 54 to a predetermined level. It is to be understood that the electrical circuit described herein is for illustrative purposes only and that it would be obvious to one skilled in the art that a variety of electrical circuit could be used.

It is to be understood that I have described an improved filtering device comprising a pair of filter elements 54 disposed in a fluid chamber 36 with partition means separating the two filter elements. One filter element 54 is in the filtering chamber engaging the system fluid as it is delivered from the inlet to the outlet of the housing. The pressure sensing means 130 detects the pressure change associated with the filter element 54 in the filtering chamber 34 assuming a clogged condition and energizes the motor 82 so that the two filter elements are exchanged with the clogged element being exposed to the nozzle 128 as it moves from the filtering chamber 34 into the cleaning chamber 36. The nozzle introduces clean pressurized fluid against the exterior surface of the clogged filter element to dislodge the foreign matter that has accumulated thereon. When the two filter elements have been rotated 180° so that the clogged element is in the cleaning chamber, the source of pressurized fluid 116 energized by a circuit (not shown) actuates the piston 106 which produces a fluid pressure wave in a reverse direction through the clogged element 54 so that the foreign matter is discharged through the conduit 98 to the sump 96 thereby leaving the element in the cleaning chamber in a clean condition ready for the next cycle.

Although I have described but one preferred embodiment of my invention, it is to be understood that various changes and revision can be made therein without departing from the spirit of the invention or the scope of the appended claims.

Having described my invention, I claim:

1. A filter device for separating foreign matter from a moving fluid comprising, a housing means providing a fluid filter chamber, said housing means having an inlet for receiving the fluid to be filtered and an outlet for filtered fluid, said inlet and said outlet communicating with said filter chamber, partition structure and means rotatably mounting said partition structure in said filter chamber, said partition structure at one operative position subdividing said filter chamber into a first subchamber and a second subchamber, said first subchamber being in fluid communication with said inlet and said outlet and said second subchamber being separated from normal fluid flow from said inlet and said outlet by said partition structure, a first and a second filter element mounted on opposite sides of said partition structure, one of said filter elements being disposed in said first subchamber and the other of said filter elements being disposed in said second subchamber when said partition structure is in one operative position so that the fluid being received through said inlet passes through the filter element and said first subchamber in a first direction so that foreign matter in said fluid is collected by the filter element in said first subchamber, pressure chamber means fluidly connected with said second subchamber, a piston axially slidably mounted in said pressure chamber and operable upon being actuated to produce a fluid surge in a reverse direction through the filter element disposed in said second subchamber so as to dislodge foreign matter from the filter element in said second subchamber, means for rotating said partition structure between operative positions when the filter element in said first subchamber assumes a clogged condition so that the filter element in said first subchamber is rotated into said second subchamber and the filter element in said second subchamber is rotated into said first subchamber, and means responsive to the change in operative positions of said partition structure to actuate piston to produce a back flow to clean the filter element disposed within said second subchamber.

2. The filter device as defined in claim 1, wherein said housing means has a sediment chamber formed below said second subchamber for receiving sediment dislodged from the filter element disposed in said second subchamber.

3. A filter device as defined in claim 1, including conduit means connecting said second subchamber with a sump and wherein said piston produces a reverse fluid flow through the filter element in said second subchamber and toward said conduit means when said partition structure is in one of said rotated positions.

4. A filter device as defined in claim 1, including an annular wear plate mounted in said housing means and spring means in said housing means resiliently urging the plate into engagement with the filter elements to assist in sealing said first subchamber from said second subchamber when the partition structure is in one of said rotated positions.

5. A filter device as defined in claim 1, including sensing means on said housing means operative to transmit a signal upon sensing a change in the filtering condition of the filter element in said first subchamber and wherein said rotating means is responsive to a signal from said sensing means to rotate said partition structure between said rotated positions.

6. A filter device as defined in claim 1, wherein said fluid chamber has sidewalls forming a portion of a cylinder having an axis coinciding with the axis of rotation of said partition structure and said partition structure comprises a generally planar wall member, and including vane members carried by said wall member sealingly engageable with the sidewalls of said internal chamber when said partition structure is in one of said rotated positions.

7. A filter device as defined in claim 1, wherein said filter elements are individually separable from said partition structure.

8. A filter device as defined in claim 1, wherein the means for mounting each of said filter elements on said partition structure includes a pair of elongated clips, each having a generally J-shaped cross section and being mounted in side-by-side relationship, one of said clips being attached along one of its longitudinal edges to said filter elements and the second of said clips having one of its longitudinal edges fixedly mounted on said partition structure, and including an elongated retaining clip having a generally C-shaped cross section for interengaging each pair of said J-shaped clips.

9. The filter device as defined in claim 1, wherein said pressure chamber is above said second subchamber and including air-bleed means connected to said pressure chamber.

10. A filter device as defined in claim 1, wherein said partition structure includes a wall disposed intermediate said first filter element and said second filter element, and vane members mounted on opposite side edges of said wall and engaging the walls of said fluid chamber to divide said fluid chamber into said first subchamber and said second subchamber.

11. The filter device as defined in claim 10, including a plate disposed in said fluid chamber and resilient means urging said plate into engagement with said filter element to cooperate with said vane member to prevent fluid leakage from said first subchamber into said second subchamber when said partition structure is in an operative position.

12. A filter device for separating foreign matter from a moving fluid medium comprising, housing means providing a fluid chamber and having sidewalls forming a portion of a cylinder, said housing having an inlet for receiving fluid to be filtered and an outlet for filtered fluid each fluidly connected with said filter chamber, a carrier structure and means rotatably mounting said carrier structure in said fluid chamber for rotation between operative positions about the axis of the cylinder defined by said sidewalls, partition means carried by said carrier structure and including resilient vane members at opposite ends of the partition means and engaging the sidewalls of said fluid chamber at the operative positions of said carrier structure to subdivide said chamber into a plurality of subchambers including a first subchamber fluidly connecting the inlet and outlet of said housing means and a second subchamber normally fluidly separated from said first subchamber and from said inlet and said outlet, a plurality of similarly shaped filter elements mounted on said carrier structure, each of said filter elements having a partially cylindrical shape so that said filter elements collectively form a substantially cylindrical filter means having an axis coinciding with the axis of rotation of said carrier structure, at least one of said filter elements being disposed in said first subchamber so that unfiltered fluid is delivered in a first radial direction through said filter element for the separation of foreign matter and a second of said filter elements being disposed in said second subchamber when said carrier structure is in an operative position, means operable upon being actuated to produce a backwash through the clogged filter element in said second subchamber in a radial direction opposite to said first radial direction to clean said clogged filter element, said last mentioned means including a pressure chamber connected with said second subchamber and a piston disposed in said pressure chamber and operable upon being actuated to produce a pressure surge into said second subchamber.

13. A filter device as defined in claim 12, including means for introducing fluid into said pressure chamber comprising a fluid connection from the inner side of the filter element in said first subchamber to said pressure chamber.

14. A filter device as defined in claim 12, including means responsive to a signal for rotating said carrier structure between said rotated positions and including signal producing means operable upon sensing the filter element in said first subchamber assuming a clogged condition for transmitting a signal to said rotating means.

15. A filter device as defined in claim 14, wherein said signal producing means is operable to sense a pressure change in the fluid caused by the filter element in said first subchamber assuming a predetermined clogged condition.

References Cited

UNITED STATES PATENTS

| | | | |
|---|---|---|---|
| 280,828 | 7/1883 | Howes | 210—412 |
| 550,583 | 12/1895 | Brinckman et al. | 210—409 |
| 2,022,016 | 11/1935 | Wardle | 210—332 |
| 2,077,589 | 4/1937 | Seaver et al. | 210—167 |
| 2,119,433 | 5/1938 | Haught | 210—106 |
| 2,362,750 | 11/1944 | Hayward | 210—412 |
| 3,074,556 | 1/1963 | Rosaen | 210—195 |

REUBEN FRIEDMAN, *Primary Examiner.*

F. A. SPEAR, JR., *Assistant Examiner.*

U.S. Cl. X.R.

210—333, 408, 412

PO-1050
(5/69)

UNITED STATES PATENT OFFICE
CERTIFICATE OF CORRECTION

Patent No. 3,425,558     Dated February 4, 1969

Inventor(s) Nils O. Rosaen

It is certified that error appears in the above-identified patent and that said Letters Patent are hereby corrected as shown below:

IN THE SPECIFICATIONS:

Column 3, line 23, "fiuid" should be --fluid--.

IN THE CLAIMS:

Column 7, line 22, "flltered" should be --filtered--.

SIGNED AND
SEALED
NOV 4 1969

(SEAL)
Attest:

Edward M. Fletcher, Jr.
Attesting Officer

WILLIAM E. SCHUYLER, JR.
Commissioner of Patents